(12) United States Patent
Schenck

(10) Patent No.: US 7,458,999 B2
(45) Date of Patent: Dec. 2, 2008

(54) METHOD OF STORING SOLAR ENERGY

(76) Inventor: Gunter O. Schenck, deceased, late of Mulhein-Ruhr (DE); by Gunter Edwin Schenck, legal representative, Am Buhl 49, D 45481 Mulhein-Ruhr (DE)

( * ) Notice: Subject to any disclaimer, the term of this patent is extended or adjusted under 35 U.S.C. 154(b) by 485 days.

(21) Appl. No.: 10/766,262

(22) Filed: Jan. 27, 2004

(65) Prior Publication Data

US 2004/0182689 A1 Sep. 23, 2004

Related U.S. Application Data

(63) Continuation-in-part of application No. 10/091,066, filed on Mar. 5, 2002, now abandoned, which is a continuation of application No. PCT/EP00/08649, filed on Sep. 5, 2000.

(30) Foreign Application Priority Data

Sep. 6, 1999 (DE) ................................ 199 42 398

(51) Int. Cl.
*C10L 5/00* (2006.01)
(52) U.S. Cl. .......................... 44/605; 44/620
(58) Field of Classification Search ................... 44/605, 44/620
See application file for complete search history.

(56) References Cited

U.S. PATENT DOCUMENTS

| 3,942,956 A | 3/1976 | Ito |
| 4,101,292 A | 7/1978 | Hogan, II |
| 4,272,322 A | 6/1981 | Kobayashi |
| 5,436,516 A | 7/1995 | Yamazaki et al. |
| 5,707,762 A | 1/1998 | Johnssen |

FOREIGN PATENT DOCUMENTS

| DE | 35 26 879 A1 | 2/1987 |
| DE | 40 35 927 A1 | 5/1992 |

OTHER PUBLICATIONS

Okimori, et al. Potential of CO2 emission reductions by carbonizing biomass waste from industrial tree plantation in South Sumatra, Indonesia. Mitigation and Adaptation Strategies for Global Change ; Earth and Environmental Science, vol. 8, No. 3;pp. 261-280; Sep. 2003.*
Dominion Virginia Power Customer Connection, Keeping carbon out of the air, Aug. 2007,pp. 1-2.*
UnserWald (Our Forest), Nature and Economic Factor at the same time, 1999, pp. 41-45.
Selfritz, "Should We Store Carbon in Charcoal?", Int. J. of Hydrogen Energy, vol. 18, No. 5. pp. 405-407, 1993, Great Britain.
Rompp Lexikom Umwelt (Environment), 1993.
Rompp Chemie Lexicon, 1993.

* cited by examiner

*Primary Examiner*—Cephia D Toomer
(74) *Attorney, Agent, or Firm*—Lawrence G. Fridman

(57) ABSTRACT

An amount of photosynthetic biomass such as wood is converted into coal such as charcoal and a substantial amount thereof is permanently stored until the atmospheric $CO_2$ level is reduced to an extent which is unable to cause a greenhouse effect. While a main portion of the charcoal remains in permanent storage, a fraction thereof may be retained prior to or retrieved during or after achievement of the reduction in the atmospheric $CO_2$ level. Such fraction is converted into energy or an energy source, for example hydrogen, in a manner such that thereby the atmospheric $CO_2$ is maintained at a level which does not cause an undesired greenhouse effect.

36 Claims, No Drawings

METHOD OF STORING SOLAR ENERGY

This application is a continuation-in-part application of U.S. patent application Ser. No. 10/091,066 filed Mar. 5, 2002, which is abandoned, which is in turn a continuation of PCT/EP00/08649, filed Sep. 5, 2000, which claims priority of German Patent Application 199 42 398.9, filed Sep. 6, 1999.

FIELD OF THE INVENTION

The invention relates to a method of storing solar energy in conjunction with reducing the presently existing excessive atmospheric carbon dioxide ($CO_2$) level which is believed to cause undesirable changes in the earth's climate.

This climate change is also believed to result from the increasing world energy demand. Thus, the world energy requirements have been met in the past essentially by combustion of a regrowable fuel such as wood. However, as a consequence of the industrialization, which has continuously kept increasing since about 1850, the use of non-regrowable fossil fuels like coal, oil, natural gas etc. has been steadily rising in order to meet the increasing energy demands.

DESCRIPTION OF THE PRIOR ART

As a first consequence of the aforementioned situation, exhaustion of the readily accessible sources of the fossil fuels has become foreseeable. Consequently, substitution of the fossil energy sources by regrowable energy sources is considered desirable again in more recent times. For example, bioalcohol from agricultural source has been added to gasoline for driving automobiles; in the same vein, Diesel fuel has been replaced with rape-seed oil. Also, charcoal, which is produced from trees or wood, or plant coal has been proposed as fuel in U.S. Pat. No. 4,318,710 issued to M. Pilipski on Mar. 9, 1982, as well as the coal-like products obtained from agricultural waste or paper sludge in U.S. Pat. No. 4,272,322 issued to M. Kobayashi on Jun. 9, 1981. Gaseous fuel in the form of synthesis gas, which constitutes a mixture of carbon monoxide and hydrogen, has been shown to be obtainable from organic compounds such as wood as well as other biomasses, see U.S. Pat. No. 3,942,956, issued to S. Ito on Mar. 9, 1976, or from agricultural waste as shown by U.S. Pat. No. 5,707,762, issued to W. Johnssen on Jan. 13, 1998. Pyrolysis and gasification also yield gaseous fuel from agricultural waste according to German Published Patent Application No. 196 18 213, published on Nov. 13, 1997, in the name of Hugo Petersen Company for Process-technical Plant Construction, as well as International Published Application No. WO 00/06671, published on Feb. 10, 2000, in the name of Stichting Energieonderzoek Centrum Nederland (Dutch Stichting Energy Research Center). According to German Published Patent Application No. 40 35 927, published on May 14, 1992, in the name of Battelle Institute, Frankfurt/Germany, nuclear reactors, electrical energy, wind energy, water flow energy as well as biomass combustion energy can be used for producing hydrogen as an energy source by thermal decomposition or pyrolysis of hydrocarbons or biomass in the absence of air; the carbon, which is also formed in such process is provided for non-energetic use, stored or deposited. German Published Patent Application No. 35 26 879, published on Feb. 5, 1987, in the name of H. Mächtling, Xanten, Germany, teaches storing combustible materials in an inert gas atmosphere for preventing ignition of such material. According to present understanding, it is a further consequence of the aforementioned situation that since about 1850, due to the increasing combustion of fossil and other carbon containing energy sources, there is generated and introduced into the atmosphere a greater amount of $CO_2$ than the amount of $CO_2$ which is removed from the atmosphere due to the assimilation by plants and other processes. As a result, the amount of $CO_2$ which is present in the atmosphere, has been continuously increasing since that time. In parallel therewith, the absorption of long-wavelength radiation (heat radiation) by the earth's atmosphere has also been increasing correspondingly. Thereby, there is caused a greenhouse effect which has caused increasing atmosphere temperatures and thus harmful climate changes on the earth. In respect thereof, a basic climate agreement has been concluded at the UN climate conference in Rio de Janeiro in 1992, however, no international agreement could be found with regard to the extent of the required reduction in the atmospheric $CO_2$ level at the following conference in Kyoto in 1997. A reduction by 25% of the 1990 value until 2005 and a further reduction until 2015 were considered necessary. With reference thereto, there was also proposed a trade in emission rights in order to thereby achieve a balance between nations which realize higher and lower atmospheric $CO_2$ level reductions, respectively.

The aforenoted substitution of fossil energy sources by biomass-based energy sources results in a reduction of the use of the fossil energy sources. However, such reduction does not effect a reduction in the atmospheric $CO_2$ level in view of the fact that both energy sources contain carbon the combustion of which constitutes the actual energy source. In fact, the carbon present in the biomass based energy sources derives from the atmosphere and has been integrated into the biomass as a consequence of assimilation during plant growth. Therefore, combustion of biomass-based energy sources will simply result in returning into the atmosphere the $CO_2$ which has been removed from the atmosphere in the first place. In the material balance a reduction in the atmospheric $CO_2$ level thus cannot be achieved. A certain reduction in the atmospheric $CO_2$ level may be achieved by reducing the combustion of carbon containing energy sources, for example, by improving on the heat insulation of buildings, by increasing the efficiency of power generating engines, by utilizing solar energy using solar cells or solar collectors as well as by utilizing the energy of wind energy and hydroelectric power. While all of these energy generating possibilities do effect a reduction in the $CO_2$ generation, the reduction is effected only to a limited extent such that the desired reduction in the atmospheric $CO_2$ level can not be achieved thereby. A lasting integration of atmospheric $CO_2$, however, occurs in long-lived wooden products made of wood of trees harvested from forests. When forest wood is harvested by means of clear-cutting, the assimilation power of the related forest will be lost and correspondingly also there will no longer exist any $CO_2$ assimilation. Regrowing the related forest will require decades to generate an assimilation power corresponding to the original forest and will be effective for reducing the atmospheric $CO_2$ level to full extent only after the full regrowth period.

During sustainable forestry, i.e. in the event that wood is harvested from a given forest during a harvesting operation only to the extent as such wood will regrow during a following regrowth period, the mean forest assimilation power and its mean $CO_2$ binding power will be maintained. A reduction in the atmospheric $CO_2$ level, however, then will occur only in the extent of the lower wood harvest (as compared to the aforementioned clear-cutting) and the extent to which the harvested wood is processed to yield long-lived wooden products. While it would be conceivable to effect the required reduction of the atmospheric $CO_2$ level by planting new forests, it may be considered doubtful whether the areas required therefore would be available. Furthermore, it would take decades before such new planted forests achieve full assimilation power so that the desired effect cannot be achieved within the required short period of time.

Thus, all of these known measures are neutral with respect to the atmospheric $CO_2$ level only in the most favourable cases. However, the known measures are unable to reduce the presently existing $CO_2$ level which is present in the atmosphere or originates from other sources.

DISCLOSURE OF THE INVENTION

Therefore, with the foregoing in mind, it is a primary object of the present invention to provide a new and improved method of storing solar energy which method is not afflicted by the aforementioned drawbacks and limitations of the prior art methods.

Another and more specific object of the present invention aims at eliminating the drawbacks of the prior art methods and, in particular, at providing a new and improved method of storing solar energy while simultaneously effecting a reduction in the atmospheric $CO_2$ level.

Furthermore, an important and still more specific object of the invention aims at providing a method of storing and delaying use of the stored solar energy in a manner such that the balance between the rate of $CO_2$ removal from the atmosphere and the rate of release of $CO_2$ into the atmosphere is kept at an atmospheric $CO_2$ level below the level causing the undesired greenhouse effect.

Now, in order to implement these and still further objects of the invention, which will become more readily apparent as the description proceeds, the method of the present development is manifested, among other things, by the following method steps:

Producing photosynthetically an amount of biomass capable of forming biomass coal;

harvesting the amount of photosynthetically produced biomass;

regrowing, between two successive harvesting operations, an amount of biomass which corresponds to the harvested amount of photosynthetically produced biomass;

converting the harvested amount of photosynthetically produced biomass into biomass coal;

and durably and retrievably storing the biomass coal in order to thereby reduce the atmospheric $CO_2$ level by an amount of $CO_2$ which is equivalent to the amount of carbon present in the stored amount of biomass coal.

Preferably, a sequence is carried out entailing a multiple number of the steps of harvesting and regrowing the harvested biomass, converting the harvested biomass into biomass coal and storing the biomass coal in order to thereby achieve a balance between the rate of $CO_2$ removal from the atmosphere and the rate of $CO_2$ release into the atmosphere at an atmospheric $CO_2$ level below a level which causes the undesired greenhouse effect.

A level of atmospheric $CO_2$ considered as ineffective for causing an undesired greenhouse effect may be, for example, the level agreed upon during the initially mentioned Kyoto conference.

In a further development of the inventive method, either a fraction of the biomass coal or a fraction of the stored biomass coal is converted into energy or an energy source with concomitant $CO_2$ release to the atmosphere, provided that the increase in the atmospheric $CO_2$ level caused thereby is limited to an amount which is lower than the amount of $CO_2$ equivalent to the carbon present in the stored biomass coal.

An advantageous embodiment of the inventive method relies upon selecting wood from a preferably sustainably managed forested area as the photosynthetically formed biomass, harvesting the wood, converting the harvested wood into charcoal and durably and retrievably storing the thus produced charcoal in the aforenoted manner.

The forested area may constitute an isolated forested area, a number of separated forested areas, the entire forested area of a given geographical region or a given country or number of countries.

DESCRIPTION OF PREFERRED EMBODIMENTS

Turning now specifically to Example 1, biomass coal is produced from photosynthetic biomass in known manner such as pyrolysis, dry distillation or thermal decomposition in the absence of oxygen. The biomass is harvested from a planted or forested area. Such biomass coal may constitute, for example, charcoal which is obtained from wood harvested from a forested area. The biomass coal is infed into a bunker plant, for example, a subterraneous cavity such as present in coal, ore or salt mines or the like as well as known aboveground constructions. The biomass coal storage may involve time periods of up to 20 years or even more. In order to prevent ignition or oxidative degradation, the biomass coal is preferably stored under non-ignitable protective gas having a density greater than air such as $CO_2$ or, if desired, a rare gas. Each bunker plant advantageously may be equipped with known means in a manner such that the stored biomass coal is protected from water ingress and/or excess temperatures. A number of mutually independent biomass coal reservoirs may be provided in a given bunker plant.

The carbon content of the biomass coal, which is formed from the photosynthetically produced biomass, originates from the assimilation of atmospheric $CO_2$ by the plants under the action of sunlight. According to the stoichiometric relationship, 12 parts by weight of pure carbon correspond to 44 parts per weight of $CO_2$; thus, 100 kg of biomass coal which consist of 100 percent carbon and which are stored as described hereinbefore, correspond to the removal of 366.7 kg of $CO_2$ from the atmosphere.

Considering now wood as an example of photosynthetically produced biomass, such wood is preferably obtained from a predetermined forested area managed by sustained forestry. The predetermined forested area yields an annual harvest of 1 ton of wood which is regrown during an annual growth period between two successive wood harvests. The entire amount of 1 ton of wood is converted into 350 kg of charcoal containing, on the average, 85 percent of carbon (Römpp, Chemistry Encyclopedia 1983, p. 1737), i.e. 298 kg of carbon. Due to the storage of the entire amount of charcoal (neglecting any amount of $CO_2$ which may be formed during the harvesting, converting and storing operations), the equivalent amount of $CO_2$, namely 1.09 ton, is thereby removed from the atmosphere per year. With respect to the predetermined forested area, the rate of $CO_2$ removal from the atmosphere is generally greater than the rate of $CO_2$ release into the atmosphere. Thus, when continued through the years, the balance between the rate of $CO_2$ removal from the atmosphere and the rate of $CO_2$ release into the atmosphere will result in an atmospheric $CO_2$ level which is below the $CO_2$ level causing the undesired greenhouse effect.

A predetermined amount of the annularly produced wood or charcoal may be used as an energy source by combustion; also, or alternatively, a predetermined amount of charcoal may be retrieved from the bunkering plant by conventional conveying means and may be used as an energy source by combustion. In any case, as long as the amount of $CO_2$ released thereby into the atmosphere does not exceed the amount of $CO_2$ which has been removed from the atmosphere by means of the prior charcoal storage, the atmospheric $CO_2$ level will remain below the level which existed prior to the charcoal storage.

The rate of $CO_2$ removal from the atmosphere and the atmospheric $CO_2$ level are thus determined by the amount of biomass and biomass coal produced and stored within a given time period in relation to the rate of $CO_2$ release into the atmosphere. The rate of $CO_2$ removal from the atmosphere and the atmospheric $CO_2$ level may also be agreed upon by an international convention such as the Kyoto Convention. In any event, the atmospheric $CO_2$ level can be maintained below the level, which will generate the undesired greenhouse effect, either by reducing the biomass or biomass coal utilization for generating energy by combustion or, in the alternative, by increasing the amount of biomass, which is harvested and converted into biomass coal, or by increasing the storage period of the thus produced biomass coal.

EXAMPLE 2

In a publication entitled "Unser Wald" ("Our Forest"), published by the Bundesministerium für Ernährung, Landwirtschaft und Forsten (Federal Office of Food, Agriculture and Forestry), it is stated on pages 41 and 42 that 57 million $m^3$ of wood were produced in the Federal Republic of Germany in 1997 by means of sustained forestry. The term "sustained forestry" is understood to imply that the amount of harvested wood is regrown between two successive harvesting operations. Of the produced 57 million $m^3$ of wood per year, there were harvested only 38 million $m^3$ and supplied for consumption. This amount of commercially produced wood has removed a corresponding amount of $CO_2$ from the atmosphere. A large portion of the harvested wood was further processed to yield wooden products and objects, which were not subject to combustion, while another portion was burnt for generating heat energy which resulted in concomitant release of $CO_2$ to the atmosphere. Thus, the wood processing industry and forestry contribute to the atmospheric $CO_2$ level in accordance with this relationship. In correspondence therewith, the atmospheric $CO_2$ level can be reduced if (a) the entire annual wood production of 57 million $m^3$ is harvested and supplied for consumption without combustion whereby more $CO_2$ will be removed from the atmosphere by $CO_2$ assimilation, or if (b) the wood combustion is reduced so that less $CO_2$ will be released into the atmosphere. In fact, an additional amount of about 20 million $m^3$ or more of wood is available to be harvested per year by means of sustained forestry and for conversion into charcoal which, then, is stored in accordance with Example 1. At a wood density of 0.66 kg/$m^3$, there are annularly available 13.2 million tons of wood which will yield 4.62 million tons of charcoal per year upon carbonization (0.35 tons of charcoal for each ton of wood, see Römpp, l.c.). The average carbon content of 85 percent by weight (see Römpp, l.c.) of this amount of annularly stored charcoal corresponds to 3.93 million tons of pure carbon which is the equivalent of 14.4 million tons of $CO_2$ which are annularly removed from the atmosphere by $CO_2$ assimilation during the wood regrowing process.

In a known wood carbonizer unit (Ullmann, Encyclopedia of Chemical Technology, 2003, vol. 16, pp 309, 310) for producing 100 kg of charcoal, the infed wood is pyrolyzed with an additional heat supply of 250 MJ and further by recycling the pyrolysis gas. Using carbon-rich fuel like heating oil for the additional heat supply, such heating oil has a gross calorific value of 45 MJ/kg (Brockhaus Encyclopedia 2003, vol. 3, p. 704) and contains 85 percent by weight of carbon. Consequently, 5.56 kg of heating oil are required for producing 100 kg of charcoal and contain 4.74 kg of carbon which, upon combustion, release 17.3 kg of $CO_2$ into the atmosphere according to stoichiometry. Furthermore, 286 kg of wood are required for producing 100 kg of charcoal and generate 49.2 kg of pyrolysis gas containing 12.7 kg $CO_2$, 8,8 kg carbon monoxide, 3.4 kg methane and 0.5 kg ethene (according to Römpp, l.c.) which, according to stoichiometry, respectively generate 13.8 kg, 9.35 kg and 0.8 kg of $CO_2$ on combustion. Accordingly, 36.7 kg of $CO_2$ will be released into the atmosphere as a result of recycling the pyrolysis gas.

Therefore, a total of 54 kg $CO_2$ are released into the atmosphere per 100 kg of charcoal produced during operation of the herein described carbonizer. Further amounts of $CO_2$, which are generated by Diesel driven harvesters and trucks during harvesting 286 kg of wood and transporting the same to the carbonizer are negligible in relation thereto. Considering that the aforementioned amount of 20 million $m^3$ or 13.2 million tons of wood annularly available by sustained forestry are processed in a correspondingly dimensioned carbonizer described hereinbefore, there are obtained 4.62 million tons of charcoal containing 3.93 million tons of pure carbon (Römpp, l.c.). According to stoichiometry, this amount of carbon is the equivalent of 14.4 million tons of $CO_2$ which are annularly removed from the atmosphere first by the assimilation during growth of the wood and further as a result of the charcoal storage. This amount is to be corrected for the $CO_2$ amount released as a result of the carbonization process, which generates 54 kg $CO_2$ per 100 kg of charcoal, i.e. an amount of 2.5 million tons of $CO_2$ per 4.62 million tons of charcoal. Consequently, the initially mentioned requirement is fulfilled, since the annual rate of $CO_2$ removal from the atmosphere, namely 14.4 million tons, exceeds the annual rate at which $CO_2$ is released into the atmosphere by the wood processing and charcoal storing operation, namely 2.5 million tons. By continuing this process for a number of years, there will be achieved a balance in the rates of $CO_2$ removal from the atmosphere and the release of $CO_2$ into the atmosphere such that the atmospheric $CO_2$ level is below a level which causes the undesired greenhouse effect. Also, fractions of the stored charcoal may be retrieved and utilized as an energy carrier or an energy source with concomitant $CO_2$ release into the atmosphere, provided that the retrieved charcoal so utilized is limited to an amount which will not raise the atmospheric $CO_2$ level to a value above the annularly removed amount of $CO_2$. Otherwise, the annual amount of wood to be harvested and processed to charcoal, would have to be increased in order to compensate for the excess in the $CO_2$ generation.

EXAMPLE 3

A minor fraction such as 10% of the biomass coal or charcoal as produced and stored in accordance with Example 1 or 2, respectively, is reacted with water to form hydrogen which not only represents a very high energy fuel but particularly produces simply. water upon combustion and thus is totally harmless to the environment or atmosphere. The reaction of carbon and water according to the equation of reaction $$C+2H_2O=CO_2+2H_2,$$

however, is more complicated:

In a technical pressure reactor, there occurs first a highly endothermic carbon gasification according to $$C+H_2O=CO+H_2 \tag{1}$$

only at very high temperatures, which is followed at only moderately increased temperatures by the weakly endothermic "water gas shift reaction"

$$CO+H_2O=CO_2+H_2. \quad (2)$$

In order to achieve the required temperatures above 1500° C. at the input of the pressure reactor for the coal gasification according to (1), a required amount of oxygen is admixed to the reactants water and finely divided carbon. There thus remain still about 83.4% of the coal to be processed for the production of hydrogen.

A typical Texaco plant for coal gasification (Kirk-Othmer, ENCYCLOPEDIA OF CHEMICAL TECHNOLOGY 3rd Ed. Vol. 12, Wiley, New York, pp. 959/960) having a capacity of $2.83 \times 10^6$ m$^3$/d of hydrogen is charged with 1,852 t/d of finely divided charcoal (of which 83.4% are process charcoal). Compared to all sorts of fossil coal, charcoal has the advantage of being free of any sulphur and heavy metal catalyst poisons whereby the useful life of the catalysts is prolonged and their efficiency is improved and any special gas purification operations become superfluous.

The stored charcoal can be accessed for hydrogen production according to reactions (1) and (2) and, therefore, provides a foundation for a hydrogen economy based on solar energy. The hydrogen thus obtained preferably is fed to fuel cells for generating electrical energy. The combustion of hydrogen yields just water as an entirely harmless combustion product and a combustion energy (measured in Joule or BTU) per unit weight which is greater than the combustion energy of carbonaceous fuels by a factor in excess of 4. Therefore, the replacement of fossil carbonaceous fuels by hydrogen will result in a corresponding reduction in the use of fossil fuels. However, this favourable result is negatively affected by the high amount of $CO_2$ which is formed as a result of the sum of reactions (1) and (2). In fact, and according to the stoichiometry of reactions (1) and (2), the formation of 4 g of hydrogen requires the oxidation of 12 g of pure carbon plus 16.6 percent, i.e. 1.97 g of carbon for heat generation in reaction (1), resulting in the formation of a total of 51 g of carbon dioxide. This result places a limitation on the amount of charcoal used for this process in order to satisfy the aforementioned requirement of maintaining the balance between the rate of $CO_2$ removal from the atmosphere and the rate of $CO_2$ release into the atmosphere such that the $CO_2$ atmospheric level does not result in the undesired greenhouse effect. Otherwise, any excessive $CO_2$ release into the atmosphere may be compensated for by increasing the amount of harvested wood and the amount of stored charcoal or continuing the process of Example 2 through a longer period of time.

The aforementioned process may also be limited to reaction (1) for producing a mixture of carbon monoxide and hydrogen which mixture is commonly known as "synthesis gas". This synthesis gas is reacted by conventional, particularly catalytic, technical processes to form the most various oxygenated organic compounds for manufacturing industrial products for use in the most various technical fields. Thus, such industrial products are obtained from renewable sources without taking recourse to fossil raw materials like crude oil, natural gas or coal.

Again, the amount of charcoal introduced into the reactor for generating the additional heat required for carrying out reaction (1), may be limited so that the $CO_2$ release into the atmosphere satisfies the condition of preventing the undesired greenhouse effect. Also in this case, any undue increase in the atmospheric $CO_2$ level can be accounted for either by increasing the wood harvest and the amount of stored charcoal, or by continuing this process without alteration through a greater number of years.

In summary, the present invention will be seen to be concerned with eliminating the undesired greenhouse effect and is based on the recognition that the excessively high atmospheric $CO_2$ level is due to the material imbalance between the high rate of $CO_2$ release into the earth's atmosphere and the low rate of $CO_2$ removal from the earth's atmosphere. The invention provides, at least for a limited geographical region, a method of reducing this material imbalance as well as the undesired greenhouse effect caused thereby. The inventive method achieves this control over the atmospheric $CO_2$ level (i) by using solar energy for assimilation of $CO_2$ and forming a corresponding amount of biomass in plants and (ii) by converting harvested biomass into biomass coal and storing the same. Such process not only can be continued through a great number of years but also permits using limited amounts of stored biomass coal as an energy carrier or energy source with concomitant $CO_2$ release into the atmosphere. In the latter case, the released $CO_2$ can be recaptured (i) by correspondingly increasing the amounts of harvested biomass and stored biomass coal or (ii) by restricting such use of the stored biomass coal to the required number of harvesting periods of unchanged amounts of biomass.

While there are shown and described present preferred embodiments of the invention, it is to be distinctly understood that the invention is not limited thereto, but may be otherwise variously embodied and practiced within the scope of the following claims.

The invention claimed is:

1. A method of storing solar energy including the steps of:
   storing solar energy by producing photosynthetically an amount of biomass convertible into biomass coal;
   harvesting said amount of photosynthetically produced biomass in which said solar energy is stored;
   regrowing, between two successive harvesting operations, and thereby further storing solar energy in an amount of biomass which corresponds to said harvested amount of photosynthetically produced biomass in which said solar energy is stored;
   converting into biomass coal said harvested amount of photosynthetically produced biomass into biomass in which said solar energy is stored; and
   durably and retrievably storing said biomass coal in which said solar energy is stored in order to thereby reduce the atmospheric $CO_2$ level by an amount of $CO_2$ which is equivalent to the amount of carbon present in the stored biomass coal.

2. The method as claimed in claim 1, wherein said step of storing said biomass coal entails storing said biomass coal with said stored solar energy under an inert gas condition.

3. The method as claimed in claim 2 wherein said step of storing said biomass coal with said stored solar energy under said inert gas condition entails using $CO_2$ as said inert gas.

4. The method as claimed in claim 1, wherein said step of storing said biomass coal with said stored solar energy entails storing said biomass coal in at least one subterraneous cavity.

5. The method as claimed in claim 4, wherein said step of storing said biomass coal with said stored solar energy in said at least one subterraneous cavity further comprises selecting said subterraneous cavity from a coal mine, an ore mine or a salt mine.

6. The method as claimed in claim 1, wherein said step of storing said biomass coal with said stored solar energy entails storing said biomass coal in an above-ground bunker facility.

7. The method as claimed in claim 1, further including the steps of:
- prior to said step of storing said biomass coal with said stored solar energy, separating a fraction of said biomass coal from a remaining portion of said biomass coal;
- respectively converting said separated fraction of said biomass coal either (i) into energy or (ii) into an energy source; and
- limiting said separated fraction of said biomass coal to an amount which, upon conversion into either energy or an energy source with concomitant release of $CO_2$, generates an amount of $CO_2$ which is smaller than the amount of $CO_2$ equivalent to the amount of carbon present in said remaining portion of said biomass coal.

8. The method as claimed in claim 7, wherein said step of converting said separated fraction of said biomass coal into either energy or an energy source includes converting said biomass coal with said stored solar energy into synthesis gas for producing industrial products.

9. The method as claimed in claim 7, wherein said step of converting said separated fraction of said biomass coal into either energy or energy source includes converting said biomass coal with said stored solar energy into hydrogen as the energy source.

10. The method as claimed in claim 1, further entailing the steps of:
- retrieving a fraction of said stored biomass coal from a remaining portion of said stored biomass coal;
- respectively converting said retrieved fraction of said stored biomass coal into either (i) energy or (ii) an energy source; and
- limiting said retrieved fraction of said stored biomass coal to an amount which, upon conversion into energy or an energy source with concomitant release of $CO_2$ into the atmosphere, generates an amount of $CO_2$ equivalent to the amount of carbon present in said remaining portion of said stored biomass coal.

11. The method as claimed in claim 10, wherein said step of converting said retrieved fraction of said biomass coal into the energy or the energy source includes converting said biomass coal into synthesis gas for producing industrial products.

12. The method as claimed in claim 10, wherein said step of converting said retrieved fraction of said biomass coal into the energy or the energy source includes converting said retrieved fraction of said biomass coal into hydrogen as the energy source.

13. The method as claimed in claim 1, further including:
- carrying out a sequence of a multiple number of said steps of harvesting, regrowing said harvested biomass with said stored solar energy, converting said harvested biomass into biomass coal and storing said biomass coal in order to achieve a balance between the rate of $CO_2$ removal from the atmosphere and the rate of $CO_2$ release into the atmosphere at an atmospheric $CO_2$ level below the level causing the undesired greenhouse effect.

14. The method as claimed in claim 13, further including the steps of:
- retrieving a fraction of said stored biomass coal from a remaining portion of said stored biomass coal;
- respectively converting said retrieved fraction of said stored biomass coal either into (i) energy or (ii) an energy source; and
- limiting said retrieved fraction of said stored biomass coal to an amount corresponding to at least one of said steps of storing said biomass in said sequence of said multiple number of steps of harvesting and regrowing said harvested biomass, converting said harvested biomass into biomass coal and storing said biomass coal.

15. The method as claimed in claim 14, wherein said step of converting said retrieved fraction of said stored biomass coal into the energy or the energy source includes converting said retrieved fraction of said stored biomass coal into synthesis gas for producing industrial products.

16. The method as claimed in claim 14, wherein said step of converting said retrieved fraction of said stored biomass coal into the energy or the energy source includes converting said retrieved fraction of said stored biomass coal into hydrogen as an energy source.

17. The method as claimed in claim 1, wherein:
- said step of storing solar energy by photosynthetically producing an amount of biomass convertible into coal entails producing an amount of wood as said amount of photosynthetically produced biomass;
- said step of harvesting said amount of photosynthetically produced biomass with said stored solar energy entails harvesting said produced amount of wood;
- said step of regrowing, between two successive harvesting operations, said amount of biomass which corresponds to said harvested amount of photosynthetically produced biomass in which said solar energy is stored entails regrowing, between two successive harvesting operations, said harvested amount of wood;
- said step of converting said harvested amount of photosynthetically produced biomass into biomass coal in which said solar energy is stored entails converting said harvested amount of wood into charcoal; and
- during said step of durably and retrievably storing said biomass coal with said stored solar energy in order to thereby reduce the atmospheric $CO_2$ level by an amount of $CO_2$ which is equivalent to the amount of carbon present in said stored biomass coal, durably and retrievably storing said charcoal in order to thereby reduce the atmospheric $CO_2$ level by said amount of $CO_2$ which is equivalent to the amount of carbon present in said stored charcoal.

18. The method as claimed in claim 17, wherein said step of storing said charcoal encompasses storing said charcoal with said stored solar energy under an inert gas condition.

19. The method as claimed in claim 18, wherein said step of storing said charcoal with said stored solar energy under said inert gas condition entails using $CO_2$ as said inert gas.

20. The method as claimed in claim 17, wherein said step of storing said charcoal entails storing said charcoal with said stored solar energy in at least one subterraneous cavity.

21. The method as claimed in claim 20, wherein said step of storing said charcoal with said stored solar energy in said at least one subterraneous cavity further comprises selecting said subterraneous cavity from a coal mine, an ore mine or a salt mine.

22. The method as claimed in claim 17, wherein said step of storing said charcoal with said stored solar energy entails storing said charcoal in an above-ground bunker facility.

23. The method as claimed in claim 17, further including the steps of:
- prior to said step of storing said charcoal with said stored solar energy, separating a fraction of said charcoal from a remaining portion of said charcoal;
- respectively converting said separated fraction of said charcoal either (i) into energy or (ii) into an energy source; and limiting said separated fraction of said charcoal to an amount which, upon conversion into either energy or an energy source with concomitant release of $CO_2$, generates an amount of $CO_2$ equivalent to the amount of carbon present in said remaining portion of said charcoal.

24. The method as claimed in claim 23, wherein said step of converting said separated fraction of said charcoal into either energy or energy source includes converting said charcoal into synthesis gas for producing industrial products.

25. The method as claimed in claim 23, wherein said step of converting said separated fraction of said charcoal into either the energy or the energy source includes converting said charcoal into hydrogen as an energy source.

26. The method as claimed in claim 18, further entailing the step of:
   retrieving a fraction of said stored charcoal from a remaining portion of said stored charcoal;
   respectively converting said retrieved fraction of said stored charcoal into either (i) energy or (ii) an energy source; and
   limiting said retrieved fraction of said stored charcoal to an amount which, upon conversion into the energy or the energy source with concomitant release of $CO_2$ into the atmosphere, generates an amount of $CO_2$ equivalent to the amount of carbon present in said remaining portion of said stored charcoal.

27. The method as claimed in claim 26, wherein said step of converting said retrieved fraction of said charcoal into the energy or the energy source includes converting said charcoal into synthesis gas for producing industrial products.

28. The method as claimed in claim 26, wherein said step of converting said retrieved fraction of said charcoal into the energy or the energy source includes converting said retrieved fraction of said charcoal into hydrogen as the energy source.

29. The method as claimed in claim 18, further including:
   carrying out a sequence of a multiple number of said steps of harvesting, regrowing said harvested wood, converting said harvested wood into charcoal and storing said charcoal in order to achieve a balance between the rate of $CO_2$ removal from the atmosphere and the rate of $CO_2$ release into the atmosphere at an atmospheric $CO_2$ level below the level causing the undesired greenhouse effect.

30. The method as claimed in claim 29, further including the steps of:
   retrieving a fraction of said stored charcoal from a remaining portion of said stored charcoal;
   respectively converting said retrieved fraction of said charcoal either into (i) energy or (ii) an energy source;
   limiting said retrieved fraction of said stored charcoal to an amount corresponding to at least one of said steps of storing said charcoal in said sequence of said multiple number of steps of harvesting and regrowing said harvested wood, converting said harvested wood into charcoal and storing said charcoal.

31. The method as claimed in claim 30, wherein said step of converting said retrieved fraction of said stored charcoal into the energy or the energy source includes converting said retrieved fraction of said stored charcoal into synthesis gas for producing industrial products.

32. The method as claimed in claim 30, wherein said step of converting said retrieved fraction of said stored charcoal into the energy or the energy source includes converting said retrieved fraction of said stored charcoal into hydrogen as an energy source.

33. The method as claimed in claim 18, wherein said step of harvesting said wood entails harvesting said wood from a given forested area.

34. The method as claimed in claim 33, further including the steps of:
   harvesting a first portion of said wood for use in the non-combusting wood processing industry; and
   harvesting an additional second portion of said wood for conversion into charcoal.

35. The method as defined in claim 34, wherein said step of harvesting said wood from said given forested area entails harvesting said wood from a sustainably forested area which has an assimilation power for atmospheric $CO_2$, said assimilation power being reduced as a result of the harvesting operation and being regained during a growth period following said harvesting operation.

36. The method as claimed in claim 35, further including the steps of:
   harvesting a first portion of said wood for use in the non-combusting wood processing industry; and
   harvesting an additional second portion of said wood for conversion into charcoal.

* * * * *